(12) United States Patent
Soh

(10) Patent No.: US 9,178,452 B2
(45) Date of Patent: Nov. 3, 2015

(54) CONTROLLER FOR BRUSHLESS DC MOTOR WITH LOW TORQUE RIPPLE AND METHOD THEREFOR

(71) Applicant: Silicon Laboratories Inc., Austin, TX (US)

(72) Inventor: Kok Hong Soh, Singapore (SG)

(73) Assignee: SILICON LABORATORIES INC., Austin, TX (US)

(*) Notice: Subject to any disclaimer, the term of this patent is extended or adjusted under 35 U.S.C. 154(b) by 39 days.

(21) Appl. No.: 14/146,096

(22) Filed: Jan. 2, 2014

(65) Prior Publication Data

US 2015/0188463 A1    Jul. 2, 2015

(51) Int. Cl.
*H03K 5/00* (2006.01)
*H02P 6/10* (2006.01)
*H02P 6/00* (2006.01)

(52) U.S. Cl.
CPC . *H02P 6/10* (2013.01); *H02P 6/002* (2013.01)

(58) Field of Classification Search
CPC .................................... H02P 6/142; H02P 6/14
USPC .................................. 318/400.13, 400.01, 700
See application file for complete search history.

(56) References Cited

U.S. PATENT DOCUMENTS

| | | | |
|---|---|---|---|
| 5,289,097 A * | 2/1994 | Erickson et al. | 318/561 |
| 5,552,685 A * | 9/1996 | Young et al. | 318/400.32 |
| 5,764,024 A | 6/1998 | Wilson | |
| 5,986,426 A * | 11/1999 | Rowan | 318/599 |
| 7,514,894 B2 | 4/2009 | Hoogzaad | |
| 7,531,975 B1 * | 5/2009 | Rana et al. | 318/254.1 |
| 7,969,108 B2 | 6/2011 | Vermeir | |

OTHER PUBLICATIONS

Silicon Laboratories Inc., "Sensorless Brushless DC Motor Reference Design," Sep. 2006, 40 pages, AN208, Rev. 0.2 9/06, Silicon Laboratories Inc., 400 W. Cesar Chavez, Austin, Texas 78701.
Actions on the Merits for Copending U.S. Appl. No. 14/146,081, filed Jan. 2, 2014.

* cited by examiner

*Primary Examiner* — David S Luo
(74) *Attorney, Agent, or Firm* — Polansky & Associates, P.L.L.C.; Paul J. Polansky

(57) ABSTRACT

A controller for a BLDC motor includes a pulse width modulator and a control circuit. The pulse width modulator provides at least one phase control signal for a corresponding phase of the BLDC motor with a pulse width determined by a duty cycle signal. The duty cycle adjustment circuit has an input for receiving the at least one phase control signal, and an output for providing a corresponding modified phase control signal by adjusting widths of pulses of the at least one phase control signal when an average current in said corresponding phase exceeds a threshold.

20 Claims, 2 Drawing Sheets

CONTROLLER FOR BRUSHLESS DC MOTOR WITH LOW TORQUE RIPPLE AND METHOD THEREFOR

CROSS REFERENCE TO RELATED APPLICATION

Related subject matter is contained in copending patent application Ser. No. 14/146,081, filed Jan. 2, 2014, entitled "Controller for Brushless DC Motor with Flexible Startup and Method Therefor," invented by the inventor hereof and assigned to the assignee hereof.

FIELD OF THE DISCLOSURE

The present disclosure relates generally to controllers for motors, and more particularly to controllers for brushless direct current motors and associated methods.

BACKGROUND

A brushless direct current (BLDC) motor typically includes a rotor containing one or more permanent magnets and a stator with electromagnets that are dynamically switched. A controller controls the motor speed and commutation by modulating the width of pulses applied to switches in each motor phase driver. The controller determines commutation time either through the use of Hall effect sensors to sense the rotor position, or by using sensorless control techniques based on the back electromotive force (EMF) on un-driven phases. In sensorless BLDC motor control, a pulse width modulator (PWM) typically provides pulses at a fixed duty cycle and the duty cycle remains fixed over relatively long periods of time until the controller changes the programmed duty cycle to another value.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

A controller for a BLDC motor as disclosed herein includes a pulse width modulator and a duty cycle adjustment circuit. The pulse width modulator provides at least one phase control signal for a corresponding phase of the BLDC motor. The duty cycle adjustment circuit has an input for receiving the at least one phase control signal, and an output for providing a corresponding modified phase control signal by adjusting widths of pulses of the at least one phase control signal when an average current in the corresponding phase exceeds a threshold. In this way the controller provides constant current drive that results in lower torque ripple, and hence quieter operation of the BLDC motor. For example, the average current signal could be an average of a measured current over a pulse width modulation period, such as one obtained using an integrator.

In another form, a BLDC motor system includes a processor, a pulse width modulator, and a duty cycle adjustment circuit. The processor has a first output for providing a duty cycle signal. The pulse width modulator has an input for receiving the duty cycle signal, and an output for providing a plurality of phase control signals to control corresponding ones of a plurality of phases of a BLDC motor. Each phase control signal is active for a time corresponding to the duty cycle signal. The duty cycle adjustment circuit has first inputs for receiving the plurality of phase control signals, a second input for receiving a measured current signal, and an output for providing a corresponding plurality of modified phase control signals by deactivating pulses of the plurality of phase control signals in response to an average of the measured current signal. In one form, the processor uses a control loop for controlling motor speed, but the duty cycle adjustment circuit is able to operate much faster to provide a constant current drive on a cycle-by-cycle basis to provide lower torque ripple, and hence quieter operation of a BLDC motor.

In yet another form, a method for use with a BLDC motor includes driving a plurality of phases of the BLDC motor by generating a corresponding plurality of pulse width modulated control signals each having a duty cycle. The method further includes reducing the duty cycle of the pulse width modulated control signals based on a time when an average current exceeds a threshold, wherein the reducing occurs by modifying the pulse width modulated control signals.

Figure 1:
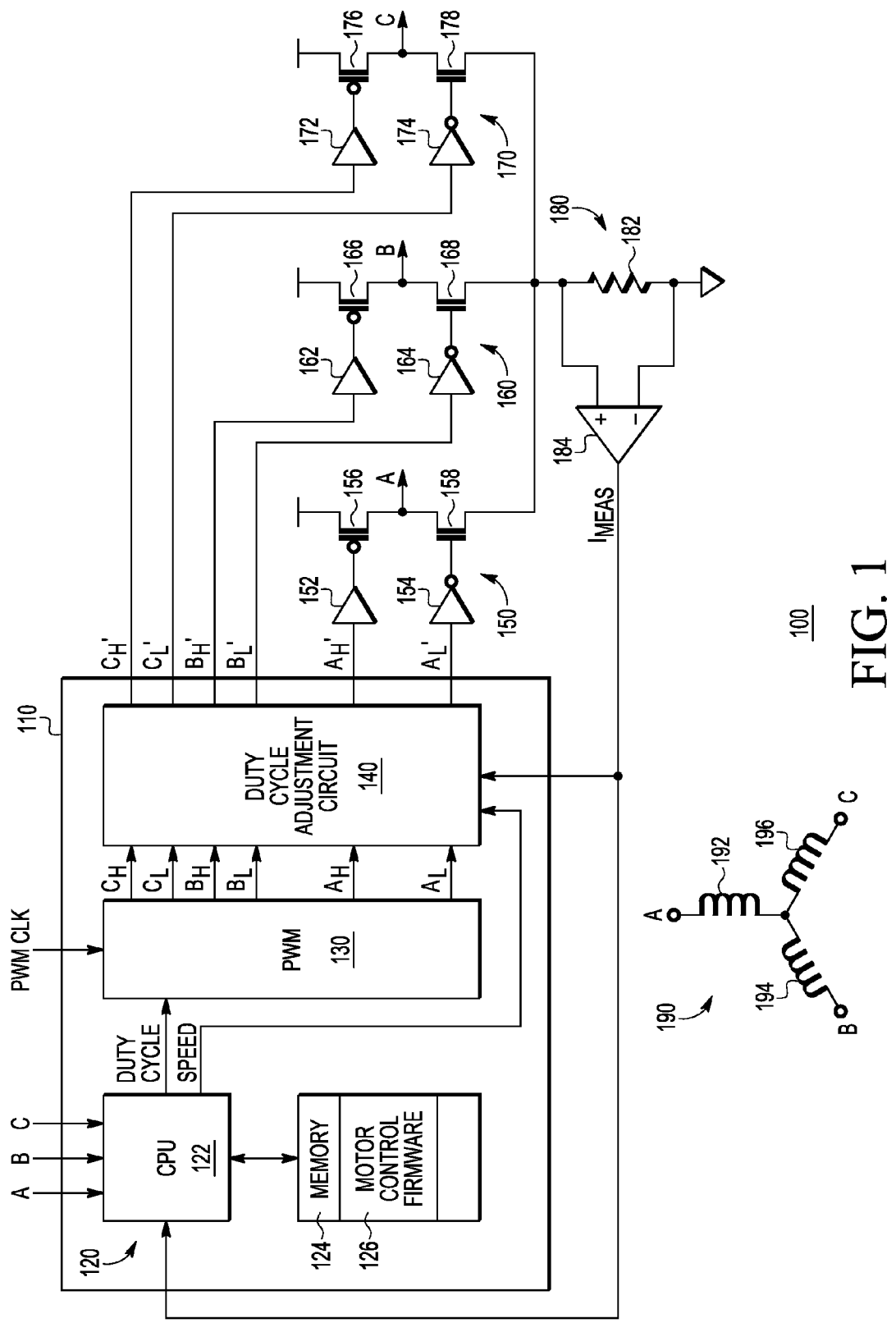
FIG. 1 illustrates in partial block diagram and partial schematic form a BLDC motor system according to one embodiment.

FIG. 1 illustrates in partial block diagram and partial schematic form a BLDC motor system 100 according to one embodiment. BLDC motor system 100 generally includes a controller 110, a set of phase drivers 150, 160, and 170, a feedback circuit 180, and a three-phase BLDC motor 190.

Controller 110 generally includes a processor 120, a PWM 130, and a duty cycle adjustment circuit 140. Processor 120 in turn includes a central processing unit (CPU) 122 and a memory 124. CPU 122 has an input for receiving a signal labeled "$I_{MEAS}$", inputs for receiving phase signals labeled "A", "B", and "C", a bidirectional memory interface, and an output for providing a signal labeled "DUTY CYCLE", and an output for providing a signal labeled "SPEED". Controller 110 is implemented as a single-chip MCU that uses analog and digital interfaces such as general purpose input/output (GPIO) ports and analog-to-digital converters that are conventional and are not shown for simplicity. Memory 124 has an access port connected to the bidirectional memory interface of CPU 122, and includes a portion for storing motor control firmware 126 including instructions for controlling BLDC motor 190.

PWM 130 has a first input for receiving the DUTY CYCLE signal, a second input for receiving a clock signal labeled "PWM CLK", and outputs for providing phase control signals. For use with a three-phase BLDC motor, PWM 130 has a first set of outputs for providing phase control signals labeled "$A_H$" and "$A_L$", a second set of outputs for providing phase control signals labeled "$B_H$" and "$B_L$", and a third set of outputs for providing phase control signals labeled "$C_H$" and "$C_L$".

Duty cycle adjustment circuit 140 has inputs connected to the outputs of PWM 130, a control input for receiving the SPEED signal, a feedback input for receiving signal $I_{MEAS}$, a first set of outputs for providing modified phase control signals labeled "$A_H'$" and "$A_L'$", a second set of outputs for providing modified phase control signals labeled "$B_H'$" and "$B_L'$", and a third set of outputs for providing modified phase control signals labeled "$C_H'$" and "$C_L'$".

Phase driver 150 includes drivers 152 and 154, a P-channel metal-oxide-semiconductor (MOS) transistor 156, and an N-channel MOS transistor 158. Driver 152 has an input for receiving the $A_H'$ phase control signal, and an inverting output. Driver 154 has an input for receiving the $A_L'$ phase control signal, and a non-inverting output. Transistor 156 has a source connected to a power supply voltage conductor, a gate connected to the output of driver 152, and a drain for providing phase signal A. The power supply voltage conductor receives a voltage suitable for the application, such as 12.0 volts. Transistor 158 has a drain connected to the drain of transistor 156, a gate connected to the inverting output of driver 154, and a source.

Phase driver 160 includes drivers 162 and 164, a P-channel MOS transistor 166, and an N-channel MOS transistor 168. Driver 162 has an input for receiving the $B_H'$ phase control signal, and an inverting output. Driver 164 has an input for receiving the $B_L'$ phase control signal, and a non-inverting output. Transistor 166 has a source connected to the power supply voltage conductor, a gate connected to the output of driver 162, and a drain for providing phase signal B. Transistor 168 has a drain connected to the drain of transistor 166, a gate connected to the inverting output of driver 164, and a source connected to the source of transistor 158.

Phase driver 170 includes drivers 172 and 174, a P-channel MOS transistor 176, and an N-channel MOS transistor 178. Driver 172 has an input for receiving the $C_H'$ phase control signal, and an inverting output. Driver 174 has an input for receiving the $C_L'$ phase control signal, and a non-inverting output. Transistor 176 has a source connected to the power supply voltage conductor, a gate connected to the output of driver 172, and a drain for providing phase signal C. Transistor 178 has a drain connected to the drain of transistor 176, a gate connected to the inverting output of driver 174, and a source connected to the sources of transistors 158 and 168.

Feedback circuit 180 includes a sense resistor 182 and an amplifier 184. Sense resistor 182 has a first electrode connected to the sources of transistors 158, 168, and 178, and a second electrode connected to ground. Amplifier 184 has a positive input connected to the first electrode of sense resistor 182, a negative input connected to the second electrode of sense resistor 182, and an output for providing signal $I_{MEAS}$.

BLDC motor 190 includes stator windings 192, 194, and 196 modeled electrically as inductors. Stator winding 192 includes a first end for receiving signal A, and a second end connected to a common node. Stator winding 194 includes a first end for receiving signal B, and a second end connected to the common node. Stator winding 196 includes a first end for receiving signal C, and a second end connected to the common node. As should be apparent, FIG. 1 shows the pertinent electrical portion of the BLDC motor and additional details of the electrical and mechanical properties of the BLDC motor are not shown in FIG. 1.

In operation, BLDC motor system 100 uses controller 110 for starting up and operating BLDC motor 190 at a desired speed by outputting a fixed high duty cycle (e.g. 99%) phase control signal for each of the three phases and changing a reference voltage designated "$V_{REF}$" in duty cycle adjustment circuit 140 in response to the SPEED signal to set the desired speed. Controller 110 provides low torque ripple and quiet operation by limiting the total current applied to BLDC motor 190 during any given phase.

PWM 130 provides the phase control signals to control the phase of BLDC motor 190 according to TABLE I, TABLE II, or TABLE III below depending on the type of drive used:

TABLE I (Low-side PWM drive)

| COMM. PHASE | ANGLE (DEG.) | HIGH-SIDE | | | LOW-SIDE | | | OPEN PHASE |
|---|---|---|---|---|---|---|---|---|
| | | $A_H$ | $B_H$ | $C_H$ | $A_L$ | $B_L$ | $C_L$ | |
| 0 | 0-60 | OFF | OFF | ON | OFF | PWM | OFF | A |
| 1 | 60-120 | ON | OFF | OFF | OFF | PWM | OFF | C |
| 2 | 120-180 | ON | OFF | OFF | OFF | OFF | PWM | B |
| 3 | 180-240 | OFF | ON | OFF | OFF | OFF | PWM | A |
| 4 | 240-300 | OFF | ON | OFF | PWM | OFF | OFF | C |
| 5 | 200-360 | OFF | OFF | ON | PWM | OFF | OFF | B |

TABLE II (High-side PWM drive)

| COMM. PHASE | ANGLE (DEG.) | HIGH-SIDE | | | LOW-SIDE | | | OPEN PHASE |
|---|---|---|---|---|---|---|---|---|
| | | $A_H$ | $B_H$ | $C_H$ | $A_L$ | $B_L$ | $C_L$ | |
| 0 | 0-60 | OFF | OFF | PWM | OFF | ON | OFF | A |
| 1 | 60-120 | PWM | OFF | OFF | OFF | ON | OFF | C |
| 2 | 120-180 | PWM | OFF | OFF | OFF | OFF | ON | B |
| 3 | 180-240 | OFF | PWM | OFF | OFF | OFF | ON | A |
| 4 | 240-300 | OFF | PWM | OFF | ON | OFF | OFF | C |
| 5 | 200-360 | OFF | OFF | PWM | ON | OFF | OFF | B |

TABLE III (Mixed-mode PWM drive)

| COMM. PHASE | ANGLE (DEG.) | HIGH-SIDE | | | LOW-SIDE | | | OPEN PHASE |
|---|---|---|---|---|---|---|---|---|
| | | $A_H$ | $B_H$ | $C_H$ | $A_L$ | $B_L$ | $C_L$ | |
| 0 | 0-60 | OFF | OFF | ON | OFF | PWM | OFF | A |
| 1 | 60-120 | PWM | OFF | OFF | OFF | ON | OFF | C |
| 2 | 120-180 | ON | OFF | OFF | OFF | OFF | PWM | B |
| 3 | 180-240 | OFF | PWM | OFF | OFF | OFF | ON | A |
| 4 | 240-300 | OFF | ON | OFF | PWM | OFF | OFF | C |
| 5 | 200-360 | OFF | OFF | PWM | ON | OFF | OFF | B |

Thus for example during commutation phase 0 using mixed-mode PWM drive, PWM 130 activates signals $C_H$ and $B_L$, causing current to flow from the power supply voltage conductor through transistor 176 to phase signal C and through stator windings 196 and 194 to phase signal B and through transistor 168 and sense resistor 182 to ground. Signals $A_H$, $B_H$, $A_L$, and $C_L$ are inactive at this time. CPU 122 measures the back EMF using the inactive phase signal A, and uses the back EMF and signal $I_{MEAS}$ to vary $V_{REF}$ to achieve the desired speed. This operation proceeds through commutation phases 1-5 according to the sequence in TABLE I, in which each commutation phase corresponds to another 60° in electrical angle. The sequence repeats after the end of commutation phase 5.

Feedback circuit 180 measures the current of an active phase across sense resistor 182. Sense resistor 182 is a low-valued, precision resistor that keeps power loss low while providing an accurate current measurement. Amplifier 184 provides signal $I_{MEAS}$ as a voltage proportional to the current in the active phase. Note that since just one high side and one low side transistor will be active at a time, the sources of transistors 158, 168, and 178 can conveniently be connected together and through a common sense resistor to ground to avoid the need for extra sense resistors and amplifiers.

Controller 110 uses phase signals A, B, and C and various real time clocks to determine when to commutate BLDC motor 190 according to its desired speed in the sequence shown in TABLE I, TABLE II, or TABLE III above. Controller 110 senses the back EMF and uses zero-crossing detection techniques to determine the commutation time. These techniques are well-known in the art and will not be discussed in detail.

Controller 110 controls the speed of BLDC motor 190 according to a control loop embodied in instructions stored in motor control firmware 126. CPU 122 executes the instructions to form the software control loop and varies $V_{REF}$ to control the speed. Controller 110 includes duty cycle adjustment circuit 140 to provide cycle-by-cycle adjustment in current to ensure the delivery of constant current to BLDC motor 190. Duty cycle adjustment circuit 140 is a hardware circuit that requires a small amount of added circuit area and thus does not add significantly to system cost. For example, controller 110 can be implemented with a low-cost microcontroller unit (MCU) using a small CPU 122 such as one based on the well-known Intel 8051 architecture, and duty cycle adjustment circuit 140 can include a small amount of circuitry that will now be described.

Figure 2:
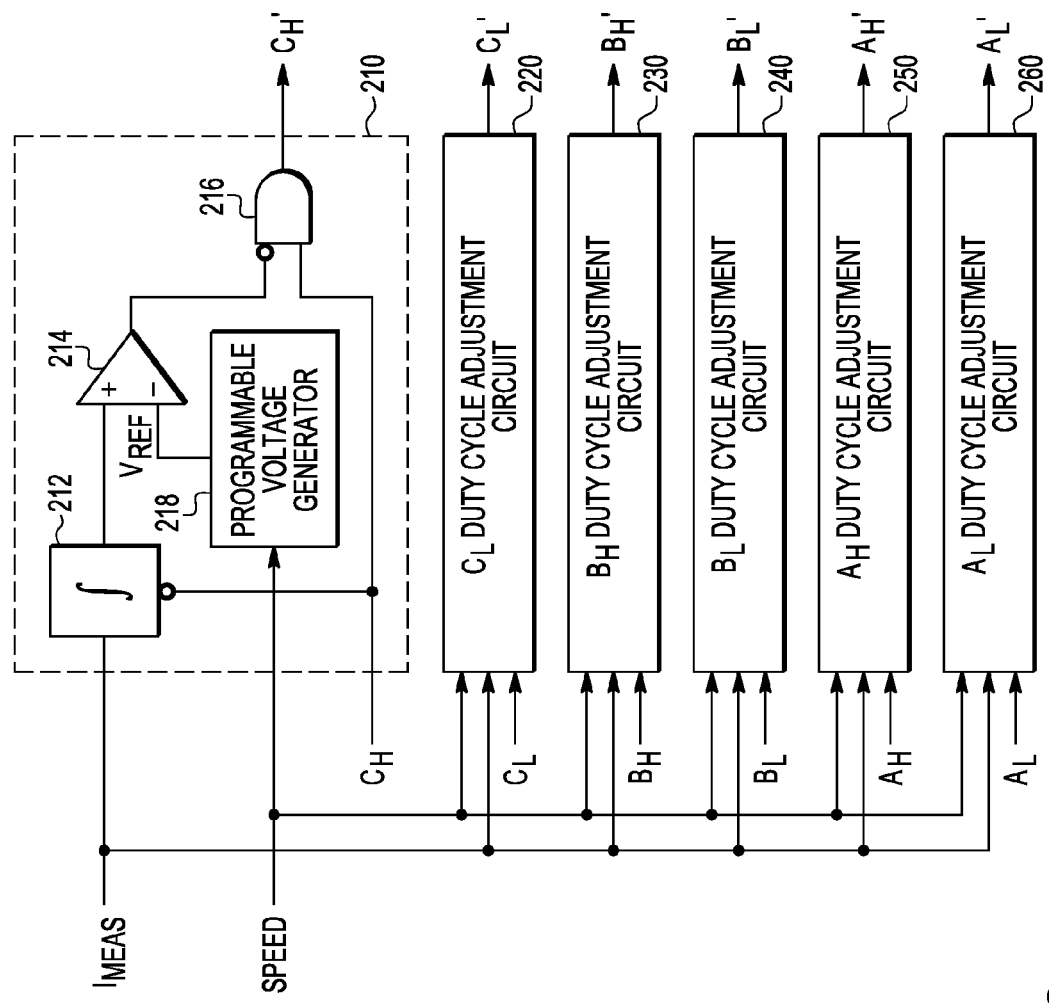
FIG. 2 illustrates in block diagram form the duty cycle adjustment circuit of FIG. 1.

FIG. 2 illustrates in block diagram form duty cycle adjustment circuit 140 of FIG. 1. Duty cycle adjustment circuit 140 includes individual duty cycle adjustment circuits for each phase control signal, including a $C_H$ duty cycle adjustment circuit 210, a $C_L$ duty cycle adjustment circuit 220, a $B_H$ duty cycle adjustment circuit 230, a $B_L$ duty cycle adjustment circuit 240, an $A_H$ duty cycle adjustment circuit 250, and an $A_L$ duty cycle adjustment circuit 260. In the embodiment of FIG. 2, the duty cycle adjustment circuit of each phase is the same and is illustrated by representative $C_H$ duty cycle adjustment circuit 210.

$C_H$ duty cycle adjustment circuit 210 includes an integrator 212, a comparator 214, and an AND gate 216. Also shown as part of duty cycle adjustment circuit 210 is a programmable voltage generator 218. In some embodiments, programmable voltage generator 218 is shared by all cycle adjustment circuits and thus is not dedicated to $C_H$ duty cycle adjustment circuit 210. In another possible embodiment, duty cycle adjustment circuit 140 would include a single duty cycle adjustment circuit constructed as shown for $C_H$ duty cycle adjustment circuit 210 in FIG. 2. Signals $C_H$, $C_L$, $B_H$, $B_L$, $A_H$, $A_L$ would be multiplexed into (and corresponding modified signals de-multiplexed out of) the single duty cycle adjustment circuit when the signal is active as a PWM signal based on the PWM drive mode shown in TABLEs I-III above. This implementation would save circuit area.

Integrator 212 has a signal input for receiving the $I_{MEAS}$ signal, an active-low reset input for receiving signal $C_H$, and an output. Comparator 214 has a positive input connected to the output of integrator 212, a negative input for receiving voltage $V_{REF}$, and an output. AND gate 216 has an active-low input connected to the output of comparator 214, an active high input for receiving signal $C_H$, and an output for providing signal $C_H'$.

Programmable voltage generator 218 has an input for receiving the SPEED signal, and an output for providing voltage $V_{REF}$. There are several possible configurations for programmable voltage generator 218. For example, programmable voltage generator 218 could include a register that stores a digital value that is decoded to select a tap of a resistor chain between the power supply voltage conductor and ground to provide voltage $V_{REF}$ at a desired value. In another example, the decoded digital value can select a tap of a resistor chain that is used to set a gain of an amplifier circuit that modifies a reference voltage to provide voltage $V_{REF}$ at the desired value. In any case, processor 120 can vary the value of voltage $V_{REF}$ in response to the desired speed.

In operation, integrator 212 remains in reset when signal $C_H$ is at a logic low. When PWM 130 activates signal $C_H$ at a logic high, integrator 212 starts to integrate, i.e. to sum over time, signal $I_{MEAS}$, and the output of integrator 212 indicates an average of signal $I_{MEAS}$ over a pulse width modulation period. While the integrated value at the output of integrator 212 does not exceed reference voltage $V_{REF}$, comparator 214 provides its output at a logic low, which causes AND gate 216 to pass signal $C_H$ to its output as signal $C_H'$. After the integrated value at the output of integrator 212 exceeds reference voltage $V_{REF}$, comparator 214 provides its output at a logic high, which forces the output of AND gate 216 to a logic low. Thus duty cycle adjustment circuit 210 limits the activation time of signal $C_H'$ and deactivates it when the accumulated current during any PWM cycle reaches a threshold, namely voltage $V_{REF}$. Programmable voltage generator 218 generates voltage $V_{REF}$ in response to the SPEED signal, which sets the current during the phase and thus the desired speed. Duty cycle adjustment circuit 140 ensures that each cycle, no more than the desired amount of current flows through the corresponding motor windings. This adjustment allows the motor to operate more smoothly, with less torque ripple and less noise.

The above-disclosed subject matter is to be considered illustrative, and not restrictive, and the appended claims are intended to cover all such modifications, enhancements, and other embodiments that fall within the true scope of the claims. For example, the technique described above is also applicable to two-phase BLDC motors and to BLDC motors having more than three phases. In some embodiments, all the elements of motor controller 110 can be combined in a low-cost CMOS integrated circuit. In some embodiments which use manufacturing technologies in which high-power transistors can be integrated with low-voltage CMOS on the same chip, motor controller 110 and phase drivers 150, 160, and 170 can be combined on the same integrated circuit chip. Moreover the conductivity types of transistors in drivers 150, 160, and 170 can vary. For example, both the pullup and pulldown transistors can be implemented with N-channel MOS transistors.

Thus, to the maximum extent allowed by law, the scope of the present invention is to be determined by the broadest permissible interpretation of the following claims and their equivalents, and shall not be restricted or limited by the foregoing detailed description.

What is claimed is:
1. A controller for a BLDC motor, comprising:
a pulse width modulator for providing at least one phase control signal for a corresponding phase of the BLDC motor with a pulse width determined by a duty cycle signal; and
a duty cycle adjustment circuit having a first input for receiving said at least one phase control signal, a second input for receiving a measured current signal, and an output, wherein said duty cycle adjustment circuit integrates said measured current signal to form an average current signal, and provides a corresponding modified phase control signal by adjusting widths of pulses of said at least one phase control signal when said average current signal in said corresponding phase exceeds a threshold.

2. The controller of claim 1, wherein said average current signal comprises an average of a measured current signal over a pulse width modulation period.

3. The controller of claim 2, wherein said duty cycle adjustment circuit comprises:
an integrator having a first input for receiving said measured current signal, a control input for receiving said corresponding phase control signal, and an output;
a comparator having a first input coupled to said output of said integrator, a second input for receiving a reference voltage, and an output; and
a logic gate having a first input coupled to said output of said comparator, a second input for receiving a first phase control signal, and an output for providing a modified first phase control signal.

4. The controller of claim 1, further comprising:
a processor coupled to said pulse width modulator for setting said duty cycle signal using a control loop.

5. The controller of claim 4, wherein said processor comprises:
a central processing unit; and
a memory coupled to said central processing unit storing instructions for controlling operation of said pulse width modulator, wherein said instructions cause said central processing unit to form said control loop.

6. The controller of claim 1, wherein said at least one phase comprises a plurality of phases and said duty cycle adjustment circuit adjusts said widths of said pulses in each of said plurality of phases in response to said duty cycle signal.

7. The controller of claim 6, wherein said duty cycle adjustment circuit comprises for each of said plurality of phases:
an integrator having a first input for receiving a measured current signal, a control input for receiving said corresponding phase control signal, and an output;
a comparator having a first input coupled to said output of said integrator, a second input for receiving a reference voltage, and an output; and
a logic gate having a first input coupled to said output of said comparator a second input for receiving a corresponding phase control signal, and an output for providing a corresponding modified phase control signal.

8. The controller of claim 7, wherein said duty cycle adjustment circuit further comprises:
a programmable voltage generator having an output for providing said reference voltage.

9. A BLDC motor system, comprising:
a processor having a first output for providing a duty cycle signal;
a pulse width modulator having an input for receiving said duty cycle signal, and an output for providing a plurality of phase control signals to control corresponding ones of a plurality of phases of a BLDC motor, each phase control signal active for a time corresponding to said duty cycle signal; and
a duty cycle adjustment circuit having first inputs for receiving said plurality of phase control signals, a second input for receiving a measured current signal, and an output for providing a corresponding plurality of modified phase control signals by deactivating pulses of said plurality of phase control signals in response to an average of said measured current signal.

10. The BLDC motor system of claim 9, wherein said duty cycle adjustment circuit provides said corresponding plurality of modified phase control signals by deactivating said pulses when said average of said measured current over a pulse width modulation period exceeds a threshold.

11. The BLDC motor system of claim 9, further comprising:
a plurality of phase drivers each having inputs for receiving respective ones of said plurality of phase control signals, and outputs adapted to couple to corresponding phases of a BLDC motor.

12. The BLDC motor system of claim 11, wherein each of said plurality of phase drivers comprises:
a first driver having an input for receiving a first phase signal of a corresponding phase, and an output;
a second driver having an input for receiving a second phase signal of said corresponding phase, and an output;
a first transistor having a first current electrode coupled to a first power supply voltage conductor, a control electrode coupled to said output of said first driver, and a second current electrode; and
a second transistor having a first current electrode coupled to said second current electrode of said first transistor, a control electrode coupled to said output of said second driver, and a second current electrode coupled to a second power supply voltage conductor.

13. The BLDC motor system of claim 12, wherein said second transistor of all of said phase drivers are coupled together and to said second power voltage conductor through a sense resistor.

14. The BLDC motor system of claim 13, further comprising:
an amplifier having a first input coupled to a first electrode of said sense resistor, a second input coupled to a second electrode of said sense resistor, and an output for providing said measured current signal.

15. The BLDC motor system of claim 9, wherein said duty cycle adjustment circuit comprises:
an integrator having a first input for receiving said measured current signal, a control input for receiving said corresponding phase control signal, and an output;
a comparator having a first input coupled to said output of said integrator, a second input for receiving a reference voltage, and an output; and
a logic gate having a first input coupled to said output of said comparator, a second input for receiving a first phase control signal, and an output for providing a modified first phase control signal.

16. The BLDC motor system of claim 9, wherein the BLDC motor comprises a three-phase inductive motor.

17. The BLDC motor system of claim 9, wherein:
said processor sets said duty cycle signal using a control loop.

18. A method for use with a BLDC motor comprising:
driving a plurality of phases of the BLDC motor by generating a corresponding plurality of pulse width modulated control signals each having a duty cycle;
measuring current in the BLDC motor to determine a measured current;
integrating said measured current to provide an average current signal; and
reducing said duty cycle of said pulse width modulated control signals based on a time when said average current signal exceeds a threshold, wherein reducing said duty cycle occurs by modifying said pulse width modulated control signals.

19. The method of claim 18, wherein reducing said duty cycle comprises:
reducing said duty cycle of said pulse width modulated control signals based on a time when said average current signal over a pulse width modulation period exceeds said threshold.

20. The method of claim 18, further comprising:
setting said threshold in response to a desired speed of the BLDC motor.

* * * * *